United States Patent [19]

Yamamoto

[11] Patent Number: 5,111,311
[45] Date of Patent: May 5, 1992

[54] IMAGE READING APPARATUS WITH BLACK LEVEL CORRECTION

[75] Inventor: Hiroyuki Yamamoto, Hachioji, Japan

[73] Assignee: Konica Corporation, Tokyo, Japan

[21] Appl. No.: 546,917

[22] Filed: Jun. 29, 1990

[30] Foreign Application Priority Data

Jul. 7, 1989 [JP] Japan .................................. 1-176690

[51] Int. Cl.$^5$ ............................................. H04N 1/40
[52] U.S. Cl. ..................................... 358/461; 358/163
[58] Field of Search ................. 358/461, 466, 163, 171

[56] References Cited

U.S. PATENT DOCUMENTS

| | | | |
|---|---|---|---|
| 4,602,293 | 7/1986 | Sekine ................................. | 358/280 |
| 4,723,174 | 2/1988 | Nishikawa et al. .................. | 358/282 |
| 4,806,780 | 2/1989 | Yamamoto et al. ................. | 358/163 |
| 4,807,045 | 2/1989 | Shimano ............................... | 358/461 |
| 4,839,729 | 6/1989 | Ando et al. .......................... | 358/163 |
| 4,903,144 | 2/1990 | Stefanik et al. ..................... | 358/461 |
| 5,001,768 | 3/1991 | Mita et al. ........................... | 358/461 |

FOREIGN PATENT DOCUMENTS

| | | |
|---|---|---|
| 0138579 | 10/1984 | opean Pat. Off. . |
| 57-104370 | 6/1982 | Japan . |
| 62-38673 | 2/1987 | Japan . |
| 62-107579 | 5/1987 | Japan . |

*Primary Examiner*—Stephen Brinich
*Attorney, Agent, or Firm*—Frishauf, Holtz, Goodman & Woodward

[57] ABSTRACT

An image reading apparatus capable of operating in a normal reading mode for outputting a digital image signal and a test mode for preparing a black correction signal, comprises an image reading device for photoelectrically reading an image and outputting an analog image signal; an A/D converter for converting the analog image signal into a digital image signal, the A/D converter being selectively provided with either a high or low reference potential to select either a wide or narrow conversion scale range, respectively; a producing circuit for producing a black level correction signal; a correction circuit for correcting an analog image signal based on the black level correction signal; and a controller for controlling the image apparatus to operate in the test mode or the normal reading mode. In the test mode, the image reading device reads a black image and outputs a black analog signal, the A/D converter is provided with the low reference potential and converts the black analog signal into a black digital signal, and the producing circuit produces a black level correction signal on the basis of the black digital signal. In the normal reading mode, the correction circuit corrects an analog image signal on the basis of the black level correction signal, and the A/D converter is provided with the high reference potential and converts the corrected analog image signal into a digital image signal.

7 Claims, 5 Drawing Sheets

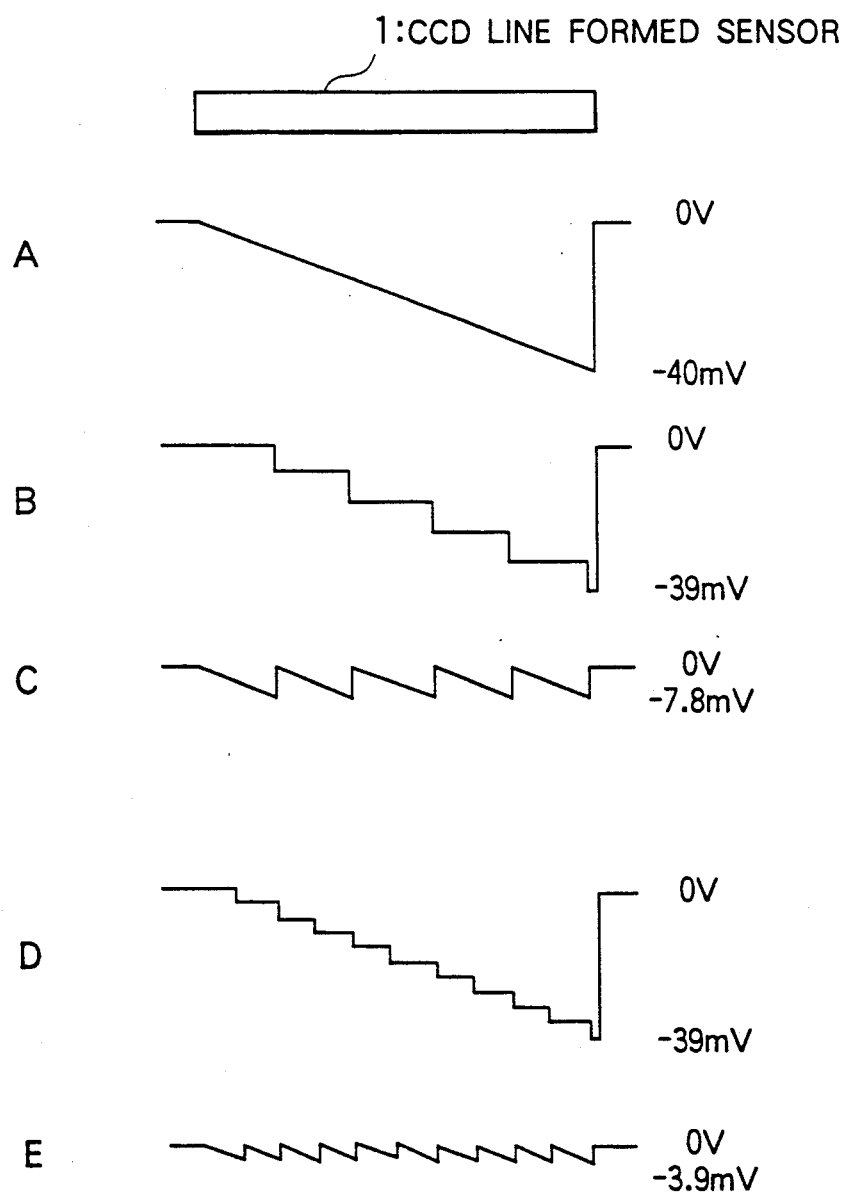

IMAGE READING APPARATUS WITH BLACK LEVEL CORRECTION

BACKGROUND OF THE INVENTION

This invention relates to an image reading apparatus which is suitable for a digital copier in which a laser beam is utilized.

An image processing apparatus, for example, a digital copier to which a laser beam is applied, is composed of the scanning part 300, the image processing part 400, and the printing part 100 as illustrated in FIG. 2.

When the scanning part 300 is operated and the document 200 is optically scanned, the image information of the document 200 is converted into an optical image. This optical image is supplied to the image processing part 400 to be converted into an image signal and the image signal is processed, wherein image processing comprises magnifying and reducing, halftoning, outline processing and so forth. When a color image is processed, the image processing includes color ghosting correction processing.

In the printing part 100, an image is recorded according to the digital image signal (the image data) which is composed of a predetermined number of bits.

FIG. 3 is a schematic illustration which shows an example of the printing part 100. In this example, an electrophotographic printer to which a photoreceptor drum is applied, is used with laser beams as the light source to form an electrostatic latent image on the photoreceptor drum.

In FIG. 3, the image data DATA outputted from the image processing part 400 is supplied to the modulation part 110 in which a signal is formed according to the image data DATA.

The signal outputted from the modulation circuit 110 is supplied to the semiconductor laser 931 and image forming is conducted. The laser driving circuit 932 is controlled by the control signal sent from the timing circuit 933 so that the laser driving circuit 932 can be driven only when the image is formed in the horizontally and vertically effective range.

The signal to indicate the amount of laser beams is fed back to the laser driving circuit 932 from the semiconductor laser 931 and the semiconductor laser 931 is controlled by the laser driving circuit 932 so that the amount of laser beams emitted by the semiconductor laser 931 can become constant.

The laser beam emitted from the semiconductor laser 931 is supplied to the polygon mirror 935 and deflected. The scanning start point of the laser beam which was deflected by the polygon mirror 935, is detected by the index sensor 936. The detected signal is converted into a voltage signal by the I/V amplifier 937 so that the index signal SI can be formed, wherein the index signal SI is not illustrated in the drawing. The index signal SI is supplied to the control means which controls the timing of optical scanning in the scanning part 300.

The numeral 934 is a motor driving circuit which rotates the polygon mirror 935. The control signal is supplied to the motor driving circuit 934 from the timing circuit 933.

FIG. 4 illustrates an example of a laser beam scanner in which image-formation is conducted. The laser beam emitted from the semiconductor laser 931 falls on the above-described polygon mirror 935 through the mirrors 942 and 943. The laser beam is deflected by the polygon mirror 935. The deflected laser beam is irradiated on the surface of the photoreceptor drum 130 through the f-θ lens 944 which is used in order to change the laser beam to the beam with a predetermined diameter.

The numerals 945 and 946 are cylindrical lenses which are used to correct the inclined angle.

The laser beam scans the surface of the photoreceptor drum 130 in the prescribed direction "a" at a constant speed by the polygon mirror 935. The surface of the photoreceptor drum 130 is exposed to the laser beam in accordance with the image data so that an electrostatic latent image can be formed.

The toner which is charged to the reversed polarity adheres to the latent image on the photoreceptor drum and the latent image is developed, which is not illustrated in the drawing. Then, a recording paper is put on the toner image. Electrical charge of the polarity which is reverse to that of the toner, is impressed on the reverse side of the recording paper by a corona charger so that the toner image can be transferred onto the recording paper. Furthermore, heat or pressure is given onto the transferred toner image so that the transferred toner image can be fixed onto the recording paper. FIG. 5 is a schematic illustration which shows an example of the scanning part 300.

In FIG. 5, the numeral 1 is a CCD line formed sensor. The output signal of the line formed sensor 1 is supplied to the input terminal of the differential amplifier 5 through the buffer 2, the sample holding circuit 3, and the clamp circuit 4, wherein they are connected in series.

The output signal of the differential amplifier 5 is supplied to the flash type A/D converter 6 of 8-bits, for instance, and converted into the digital signal. The standard voltage Vr, for example $-2V$, is supplied to the A/D converter 6. The level of the analog signal corresponding to the digital signal FFH is set by the standard voltage Vr. To be more concrete, the digital signal of 00H to FFH is outputted by the A/D converter 6 corresponding to the voltage 0V to $-2V$. In other words, the full conversion scale of the A/D converter 6 is 2V. The output signal of the A/D converter 6 is supplied to the black level correction signal producing circuit 7. The black level correction signal producing circuit 7 is provided with the memory in which the black level correction signal is written. The controller 8 controls the writing into the memory and the reading out from the memory.

In this case, when the recording key (the copy key) 9 connected with the controller 8 is pressed, firstly a test mode is carried out so that the light source (not illustrated in the drawing) which irradiates the document 200 (Refer to FIG. 2) is turned off. At this moment, output signal of the line sensor 1 is only composed of the dark current component. This dark current component is converted into the digital signal by the A/D converter 6 and supplied to the black level correction signal producing circuit 7. In the black level correction signal producing circuit 7, averaging is conducted and one line of black level correction signal is produced. This black level correction signal is written in the memory to be stored. In this case, the level of the signal supplied to the input terminal of the differential amplifier 5 is 0.

After a line of black level correction signal is produced by the black level correction signal producing circuit 7 and written in the memory, a normal reading mode is carried out so that a line of black level correction signal is repeatedly read out at each line with the signal being converted into an analog signal by the D/A converter 10. Then, the signal is supplied to the input terminal of an differential amplifier 5 through the buffer 11.

In this case, the light source is turned on and the output signal of the CCD line sensor 1 becomes the image signal which includes the dark current component. This image signal is supplied to the input terminal of the differential amplifier 5. Accordingly, the image signal from which the dark current component is eliminated, is outputted from the differential amplifier 5. This image signal is outputted as the image data DATA of 8-bits through the A/D converter 6.

According to the example illustrated in FIG. 5, the image data DATA from which the dark current component was eliminated can be obtained from the A/D converter 6.

However, in the example illustrated in FIG. 5, the full conversion scale of the A/D converter is 2V, which is the same when the dark current component is sampled in the A/D converter 6 and the black level correction signal is produced in the black level correction signal producing circuit 7. However, taking into consideration that the dark current component is generally some 10 mV, the accuracy of the above-described sampling is not good and it has the disadvantage that the wave-form of the image signal which is outputted from the differential amplifier 5 after black level correction, is deteriorated.

For example, assume that a temperature difference has occurred in the longitudinal direction of the line formed sensor 1, and that the dark current component reciprocating with each pixel of the line formed sensor 1 has occurred as illustrated in FIG. 6A, wherein the dark current component is inclined in the logitudinal direction of the sensor 1. When the dark current component described above is converted by D/A conversion after having been converted by A/D conversion with the full conversion scale 2 V, the result is as shown in FIG. 6B. Accordingly, the corrected image signal which is outputted from the differential amplifier 5 is shown in FIG. 6C. Incidentally, when the full conversion scale is 2 V, the quantization level is 2/256V=7.8mV.

SUMMARY OF THE INVENTION

The object of the present invention is to improve the wave-form of the image signal after black level correction has been conducted.

The image reading apparatus of the present invention is characterized in that: an image signal obtained by an image pick-up element is supplied to a circuit in which a black level correction circuit and an A/D converter are connected in series; when a black level correction signal is produced, the output signal of the A/D converter is supplied to a black level correction signal producing circuit and the black level correction signal used for correcting a dark current component included in the image signal is produced; when the black level is corrected, the correction signal is outputted from the black level correction signal producing circuit and supplied to the correction circuit so that a dark current component of an image signal is corrected and the corrected image signal can be outputted; the image reading apparatus is provided with a switching means by which the full conversion scale of the A/D converter can be switched; and when the black level correction signal is produced, the full conversion scale of the A/D converter is made smaller than when the black level correction is conducted.

In the above-described composition, when the black level correction signal is produced by sampling the dark current component in the A/D converter 6, the full conversion scale 6 is made small. For that reason, even when the dark current component is small, an accurate sampling can be conducted and the wave-form of the image signal after the black level has been corrected, can be improved.

BRIEF DESCRIPTION OF THE DRAWINGS

FIGS. 6A-6E are illustrations which explains the motion of the examples shown in FIG. 1 and FIG. 5.

DESCRIPTION OF THE PREFERRED EMBODIMENT

Figure 1:
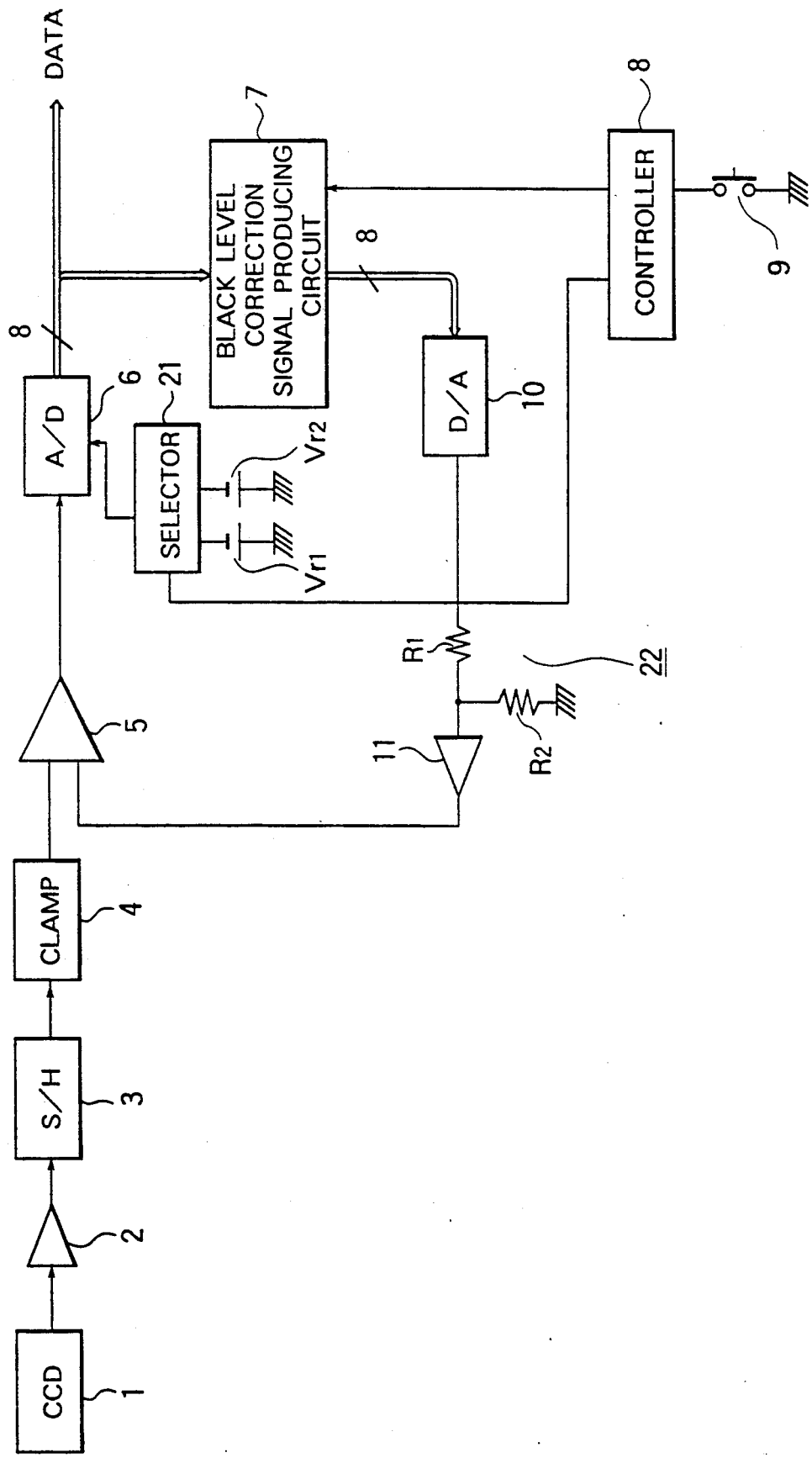
FIG. 1 is a schematic illustration which shows an example of the image reading apparatuses of the present invention.
Figure 2:
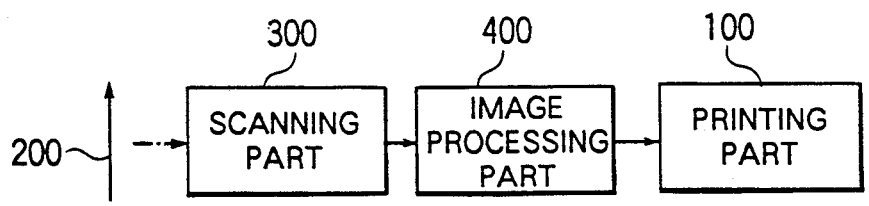
FIG. 2, FIG. 3, and FIG. 4 are schematic illustrations of the image processing apparatus.
Figure 3:
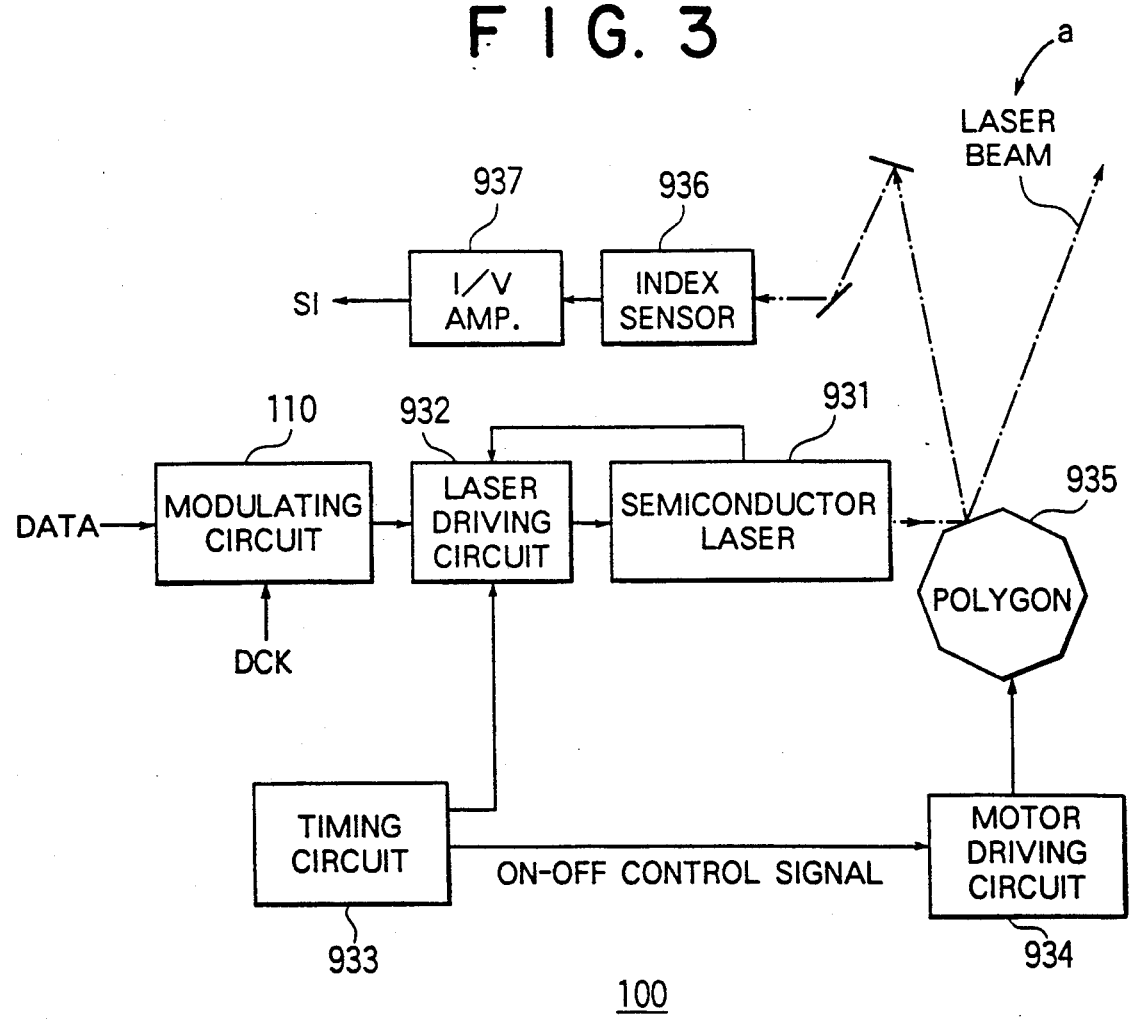
Figure 4:
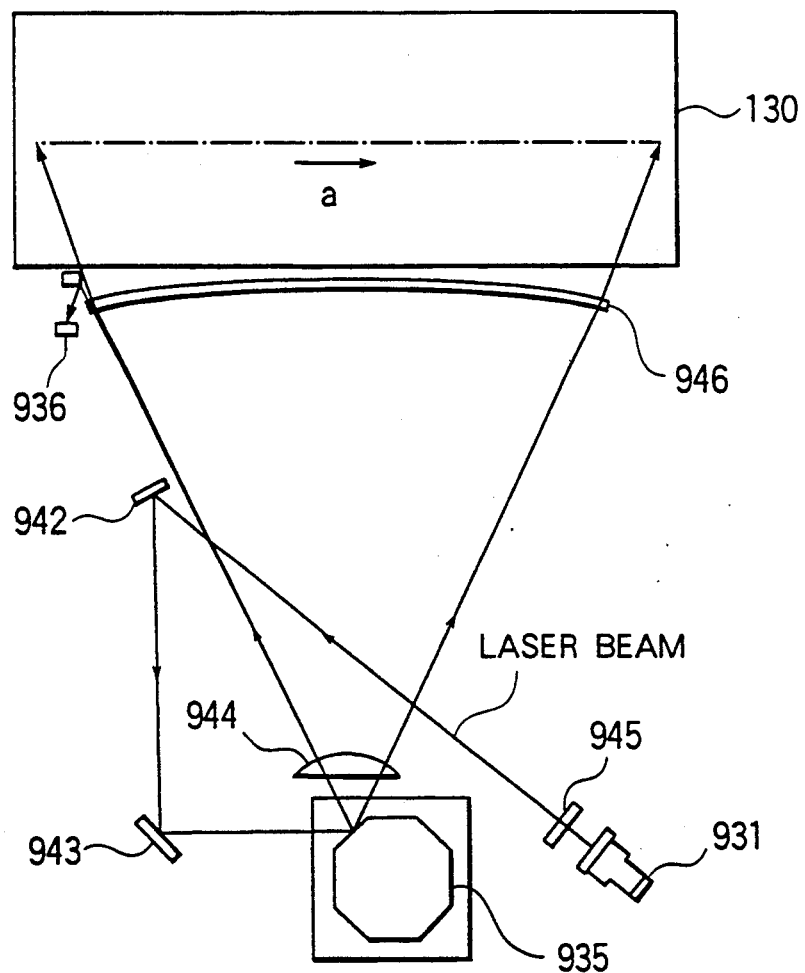
Figure 5:
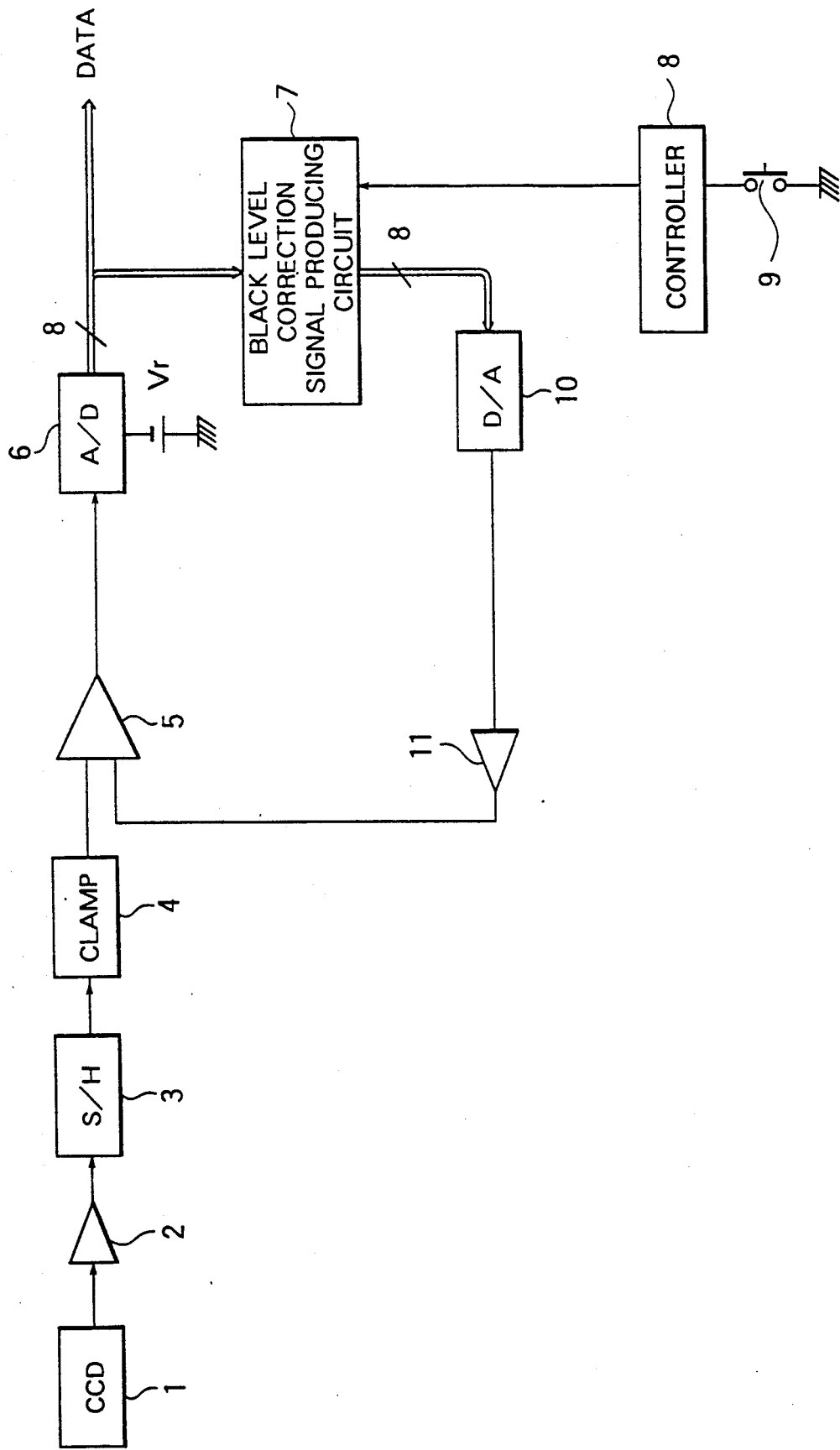
FIG. 5 is a schematic illustration which shows an example of the conventional image reading apparatuses.

Referring to FIG. 1, an example of the image reading apparatuses of the present invention will be explained. In FIG. 1, the portions which correspond to those illustrated in FIG. 5 are given the same numerals and the detailed explanation about them is omitted.

In FIG. 1, the numeral 21 is a selector to which the standard voltage Vr1 (for example, $-1V$) and Vr2 (for example, $-2V$) is supplied. In the selector 21, either the standard voltage Vr1 or Vr2 is selected and supplied to the A/D converter 6.

In this case, the selector 21 is controlled by the controller 8. When the black level signal is produced, the dark current component is sampled in the A/D converter 6 and the standard voltage Vr1 is selected and supplied to the A/D converter 6. In this way, the standard voltage Vr1 ($-1V$) is made to reciprocate with the digital signal FFH. In other words, the digital signal OOH to FFH is outputted from the A/D converter 6 reciprocating with the standard voltage (0 V to $-V$). Namely, the full conversion scale of the A/D converter 6 is 1V.

When the black level signal is corrected, the black level correction signal is supplied to the differential amplifier 5 and the standard voltage Vr2 is selected and supplied to the A/D converter 6. In this way, the standard voltage $-2V$ is made to reciprocate with the digital signal FFH. In other words, the digital signal (OOH to FFH) is outputted from the A/D converter reciprocating with the standard voltage (0V to $-2V$) Namely, the full conversion scale of the A/D converter 6 is 2V.

When the black level signal is corrected, the black level correction signal which is read out from the memory of the black level correction signal producing circuit 7 is converted into the analog signal by the A/D converter 10. After that, the signal is sent to the voltage dividing circuit 22 which is composed of the resistors R1 and R2, and compressed to the level of $R2/(R1+R2)$, in other words ½. In this case, the conditions of the equation: $R2/(R1+R2)=Vr1/Vr2$ must be satisfied. The reason why the level is compressed as described above is that as the full conversion scale of the A/D converter 6 is 1V when the black level correction signal is produced, the output signal level of the D/A converter 9 becomes double the conventional signal level.

The black level correction signal which is outputted from the voltage dividing circuit 22 is supplied to the input terminal of the differential amplifier 5 through the buffer 11.

When the recording key (the copy key) 9 connected with the controller 8 is pressed under the conditions described above, firstly a test mode is carried out so that the light source is turned off and only the dark current component becomes the output signal from the line formed sensor 1. This dark current component is converted into a digital signal by the A/D converter 6 and supplied to the black level correction signal producing circuit 7. In this case, the standard voltage Vr1 is selected by the selector 21 and supplied to the A/D converter 6. Accordingly, the full conversion scale of the A/D converter 6 is 1V. A line of black level correction signal is produced in the black level correction signal producing circuit 7 by averaging a plurality of lines, for instance, and this black level correction signal is written in the memory in order to be stored. In this case, the level of the signal which is inputted into the input terminal of the differential amplifier 5, is 0.

After a line of the black level correction signal is produced by the black level correction signal producing circuit 7, and written in the memory a normal reading mode is carried out so that a line of black level correction signal is repeatedly read out at each line. After this black level correction signal is converted into the analog signal by the D/A converter 10, it is compressed to the level of R2/(R1+R2) times or ½ time by the voltage dividing circuit 22. Then, the black level correction signal is supplied to the input terminal of the differential amplifier 5 through the buffer 11.

At this moment, the light source is turned on and the output signal of the line formed sensor 1 becomes the image signal including the dark current component. This image signal is supplied to one of the input terminals of the differential amplifier 5. Accordingly, the image signal from which the dark current component has been eliminated is outputted from the differential amplifier 5. This image signal is outputted as the image data DATA of 8-bits through the A/D converter 6. In this case, as the standard voltage Vr2 which was selected by the selector 21 is supplied to the A/D converter 6, the full conversion scale of the A/D converter 6 becomes 2V.

As explained above, in this example, when the dark current component is sampled by the A/D converter 6 in order to produce the black level correction signal, the full conversion scale of the A/D converter 6 is made small, wherein the value is 1V. Therefore, even when the dark current component is small, sampling can be conducted accurately and the wave form of the image signal after the black level signal correction was conducted, can be remarkably improved.

For instance, assume that the dark current component occurs reciprocating with each pixel of the CCD line formed sensor, wherein the dark current component is inclined in the direction of the line formed sensor arrangement as shown in FIG. 6A. After the above-described dark current component is converted by the A/D converter with the full conversion scale 1V, it is converted by the D/A converter and its level is compressed. Then, the result illustrated in FIG. 6D can be obtained. Accordingly, the corrected image signal outputted from the differential amplifier 5 is shown in FIG. 6E and it is clear that the wave form is remarkably improved. Incidentally, when the conversion scale is 1 V, the quantization level is $1/256V = 3.9$ mV.

In the example described above, the voltage dividing circuit 22 is provided to the later stage of the D/A converter 1. However, when the full conversion level of the D/A converter 10 is set to ½ of the conventional value, this voltage dividing circuit 22 becomes unnecessary.

In the above-described example, the black level correction signal is newly made and renewed in the black level correction signal producing circuit 7 each time the recording key 9 is pressed. However, the black level correction signal may be renewed at a constant interval.

In the above-described example the line formed sensor 1, in other words, a one dimension sensor was used as the image pick-up element. A two dimension sensor can also be applied to the apparatus in the same way. In this case, a screen of black level correction signal is produced in the black level correction signal producing circuit 7.

In the above-described example, when the black level correction signal is produced, the full conversion scale of the A/D converter 6 is 1 V. However, it should be understood that the present invention is not limited to the specific case described above. It is clear that the smaller the full conversion scale is made, the higher is the effect of wave-form improvement which can be expected after correction.

In the above-described example, the black level signal was corrected with the differential amplifier 5 at the stage of the analog signal. However, the black level signal may be corrected after it is converted into the analog signal. To be more concrete, the black level signal may be corrected with the black level correction signal produced in the black level correction signal producing circuit 7. In other words, the correction circuit may be provided to the later stage of the A/D converter 6 so that the black level can be corrected at the stage of the digital signal.

As explained above, according to the present invention, when the black level correction signal is produced, the full conversion scale of the A/D converter is made small. Consequently, the dark current component of a lower level can be sampled accurately and the waveform of the image signal after the black level has been corrected can be improved.

What is claimed is:

1. An image reading apparatus having a normal reading mode for outputting a digital image signal and a test mode for preparing a black correction signal, comprising:

image reading means for photoelectrically reading an image and outputting an analog image signal;

an A/D converter means for converting the analog image signal into a digital image signal, the a/D converter means being selectively provided with either a high or low reference potential to select either a wide or narrow conversion scale range, respectively;

producing means for producing a black level correction signal;

correction means for correcting an analog image signal based on the black level correction signal; and control means for controlling the image reading apparatus to selectively operate in the test mode or the normal reading mode, wherein:

in the test mode, the image reading means reads a black image and outputs a black analog signal, the A/D converter means is provided with the low reference potential and converts the black analog signal into a black digital signal, and the producing means produces a black level correction signal on the basis of the black digital signal; and in the normal reading mode, the correction means corrects an analog image signal on the basis of the black level correction signal, and the A/D converter means is provided with the high reference potential and converts the corrected analog image signal into a digital image signal.

2. The apparatus of claim 1,
wherein the correction means comprises a differential amplifier arranged between the image reading means and the A/D converter means, a first input terminal of the differential amplifier being provided with an analog image signal from the image reading means, a second input terminal of the differential amplifier being provided with the black level correction signal, and an output signal from the differential amplifier being introduced into the A/D converter means.

3. The apparatus of claim 2,
wherein in the test mode the second input terminal of said differential amplifier is provided with a potential level of zero volts.

4. The apparatus of claim 1,
wherein the image reading means includes a light source, and
wherein, in the test mode, the image reading means reads an image with the light source being switched OFF.

5. The apparatus of claim 1,
wherein the black correction signal is a digital signal and is stored in a memory.

6. The apparatus of claim 5,
further comprising a D/A converter is provided for converting the black correction signal into an analog signal, and wherein a voltage dividing circuit is provided for adjusting said reference potential of said A/D converter means between the high and low reference potential.

7. An image reading apparatus having a normal reading mode for outputting a digital image signal and a test mode for preparing a black correction signal, comprising:

image reading means for photoelectrically reading an image and outputting an analog image signal;

an A/D converter means for converting the analog image signal into a digital image signal, the A/D converter means being selectively provided with either a high or low reference potential to select either a wide or narrow conversion scale range, respectively;

producing means for producing a black level correction signal;

correction means for correcting an analog image signal based on the black level correction signal; and control means for controlling the image reading apparatus to selectively operate in the test mode or the normal reading mode, wherein:

in the test mode, the image reading means reads a black image and outputs a black analog signal, the A/D converter means is provided with the low reference potential and converts the black analog signal into a black digital signal, and the producing means produces a black level correction signal on the basis of the black digital signal; and in the normal reading mode, the A/D converter means is provided with the high reference potential and converts an analog image signal into a digital image signal, and the correction means corrects the digital signal on the basis of the black level correction signal.

* * * * *